(12) United States Patent
Sadovsky et al.

(10) Patent No.: US 7,818,559 B2
(45) Date of Patent: Oct. 19, 2010

(54) BOOT NEGOTIATION AMONG MULTIPLE BOOT-CAPABLE DEVICES

(75) Inventors: Vladimir Sadovsky, Redmond, WA (US); Hugh A. Teegan, Bellevue, WA (US); Robert Hasbun, Fall City, WA (US); Robin A. Alexander, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 624 days.

(21) Appl. No.: 11/680,040

(22) Filed: Feb. 28, 2007

(65) Prior Publication Data

US 2008/0209199 A1 Aug. 28, 2008

(51) Int. Cl.
*G06F 9/00* (2006.01)
*G06F 15/177* (2006.01)

(52) U.S. Cl. .......................................................... 713/2
(58) Field of Classification Search .................. 713/1, 713/2, 100; 709/201, 208, 227
See application file for complete search history.

(56) References Cited

U.S. PATENT DOCUMENTS

| | | | |
|---|---|---|---|
| 5,671,366 A * | 9/1997 | Niwa et al. ................. 710/303 |
| 5,826,043 A | 10/1998 | Smith et al. | |
| 5,887,164 A * | 3/1999 | Gupta ............................ 713/2 |
| 5,999,989 A | 12/1999 | Patel | |
| 6,055,631 A | 4/2000 | Chadlha | |
| 6,128,661 A | 10/2000 | Flanagin et al. | |
| 6,151,646 A * | 11/2000 | Watts et al. .................... 710/72 |
| 6,285,911 B1 | 9/2001 | Watts, Jr. et al. | |
| 6,405,320 B1 * | 6/2002 | Lee et al. ..................... 713/300 |
| 6,549,968 B1 | 4/2003 | Hart | |
| 6,584,533 B1 | 6/2003 | Cho et al. | |
| 6,691,160 B1 | 2/2004 | Bradley | |
| 6,725,310 B2 | 4/2004 | Shoobe et al. | |
| 7,010,634 B2 | 3/2006 | Silvester | |
| 7,093,124 B2 | 8/2006 | Girard | |
| 2003/0126335 A1 | 7/2003 | Silvester | |
| 2004/0019724 A1 | 1/2004 | Singleton et al. | |
| 2004/0236997 A1 | 11/2004 | Poo | |
| 2005/0005102 A1 | 1/2005 | Meggitt et al. | |
| 2005/0193188 A1 * | 9/2005 | Huang ........................... 713/1 |

(Continued)

FOREIGN PATENT DOCUMENTS

KR  1020040013641 A1  2/2004

OTHER PUBLICATIONS

European Search Report cited in related Application No. 08713928 dated Mar. 16, 2010.

(Continued)

*Primary Examiner*—Thomas Lee
*Assistant Examiner*—Brandon Kinsey (57) ABSTRACT

A first device discovers the capabilities of a second device. The first device determines which of the first device and the second device is to execute a controlling boot image based at least in part on the capabilities of the first device and the second device. A first boot image is executed by the first device when the first device is determined to execute the controlling boot image, the second device to be a resource for the first boot image. The first device sends a second boot image stored on the first device to the second device when the second device is determined to execute the controlling boot image, wherein the first device to be a resource for the second boot image.

20 Claims, 9 Drawing Sheets

U.S. PATENT DOCUMENTS

2005/0266879 A1* 12/2005 Spaur et al. .............. 455/556.2
2006/0098666 A1   5/2006 Francis Conde Powell et al.
2006/0130004 A1   6/2006 Hughes et al.
2008/0222375 A1*  9/2008 Kotsovinos et al. ......... 711/162

OTHER PUBLICATIONS

International Search Report cited in related Application No. PCT/US2008/051756 dated May 27, 2008.

Paul Stanley "A Software Architecture for Docking Stations" WinHEC 99 White Paper, Dec. 14, 2006.

Microsoft Corporation "Microsoft® Windows® XP Professional Resource Kit Documentation", published Oct. 17, 2001, chapter 7, retrieved from the Internet http://www.microsoft.com/mspress/books/sampchap/5566c.aspx on Dec. 14, 2006.

Communication pursuant to Article 94(3) EPC cited in related European Application No. 08713928.3-2211 dated May 26, 2010, 4 pgs.

* cited by examiner

| COMPONENT | ATTRIBUTE | VALUE |
|---|---|---|
| PROCESSOR | CLOCK SPEED | 3.8 GHz |
| | L2 CACHE | 4 MB |
| | BUS SPEED | 1066 MHZ |
| MEMORY | TYPE | DDR2 |
| | SIZE | 2GB |
| STORAGE DEVICE | TYPE | HDD |
| | CAPACITY | 100GB |
| | FREE SPACE | 60GB |
| ….. | ….. | ….. |

BOOT NEGOTIATION AMONG MULTIPLE BOOT-CAPABLE DEVICES

BACKGROUND

Mobile devices are often connected to other computing devices. Traditionally, the relationship between the devices is assumed before the devices are connected. For example, when a user connects a mobile phone to a personal computer, the assumption is often that the personal computer acts as a host to the mobile phone. Current systems do not negotiate the roles of devices based on the capabilities of the devices.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Embodiments of the invention enable multiple boot-capable devices to determine which device will execute a controlling boot image based on boot negotiations. The remaining device may serve as a resource for the controlling boot image. The boot determination may be based on each device's resources, predefined policies, and/or user interaction.

Many of the attendant features will be more readily appreciated as the same become better understood by reference to the following detailed description considered in connection with the accompanying drawings.

BRIEF DESCRIPTION OF THE DRAWINGS

Like reference numerals are used to designate like parts in the accompanying drawings.

DETAILED DESCRIPTION

The detailed description provided below in connection with the appended drawings is intended as a description of the present examples and is not intended to represent the only forms in which the present examples may be constructed or utilized. The description sets forth the functions of the examples and the sequence of steps for constructing and operating the examples. However, the same or equivalent functions and sequences may be accomplished by different examples.

In the following description and claims, the term "coupled" and its derivatives may be used. "Coupled" may mean that two or more elements are in contact (physically, electrically, magnetically, optically, etc.). "Coupled" may also mean two or more elements are not in contact with each other, but still cooperate or interact with each other (for example, communicatively coupled).

Figure 1:
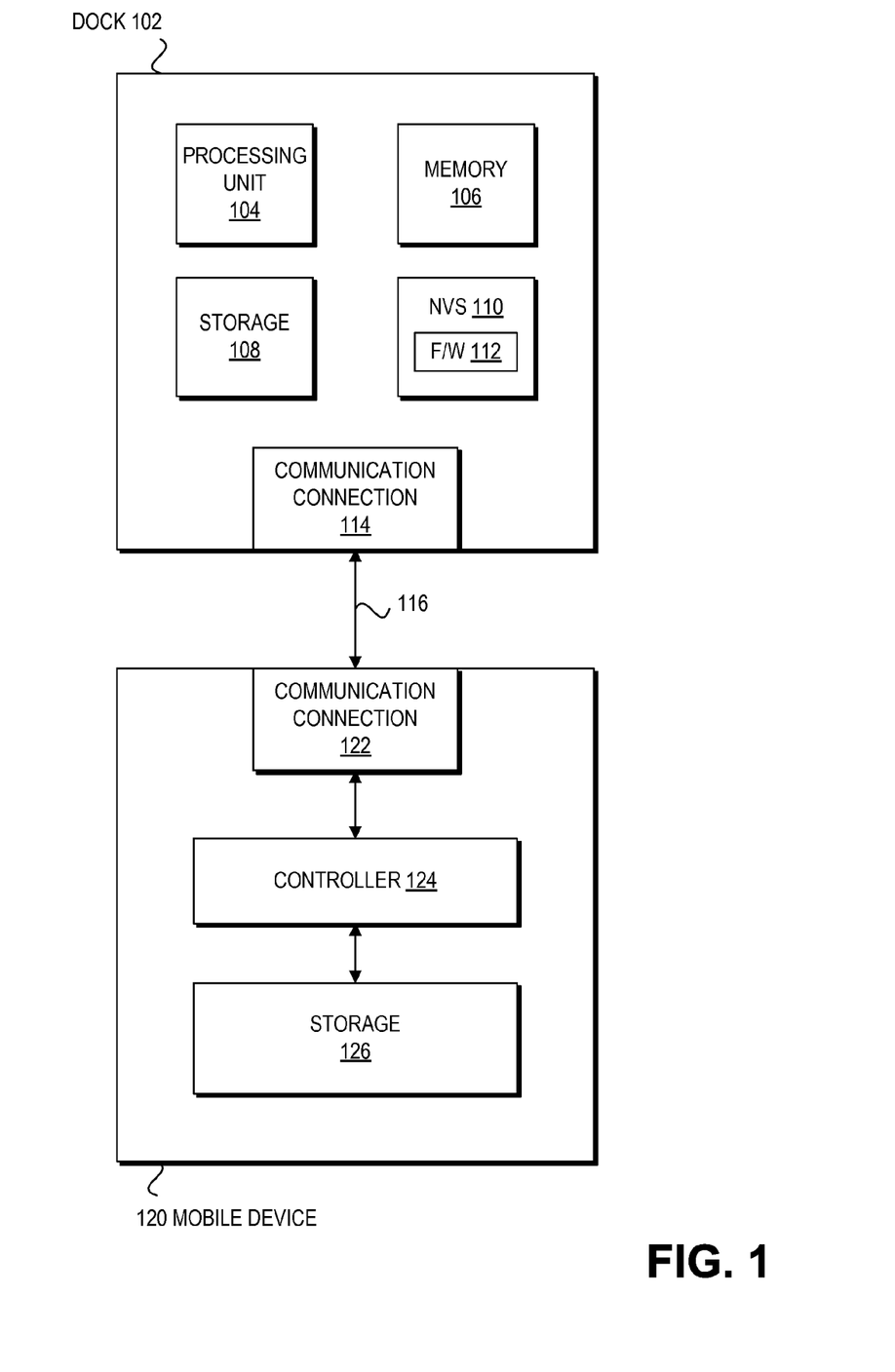
FIG. 1 is a block diagram of a dock connected to a mobile device in accordance with an embodiment of the invention.

FIG. 1 and the following discussion are intended to provide a brief, general description of a suitable computing environment to implement embodiments of the invention. The operating environment of FIG. 1 is only one example of a suitable operating environment and is not intended to suggest any limitation as to the scope of use or functionality of the operating environment. Although not required, embodiments of the invention will be described in the general context of "computer readable instructions" being executed by one or more computing devices. Computer readable instructions may be distributed via computer readable media. Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 1 shows a dock 102 connected to a mobile device 120 via connection 116. As used herein, a dock refers to a computing device that may be connected to a mobile device, such as mobile device 120. Embodiments of the invention evaluate the capabilities of the dock and the dock's ability to boot from a boot image stored on mobile device 120. For example, dock 102 may include a "dumb" dock, such as a mobile device cradle, that merely replicates mobile device ports for easing connection to other computing devices. In another example, dock 102 may include a "smart" dock, such as a laptop, that has its own processing unit, memory, storage, and so on.

Dock 102 may include a processing unit 104 and memory 106. Dock 102 also includes a communication connection 114 for inputting/outputting data from mobile device 120. Dock 102 may also include storage 108, such as a Hard Disk Drive (HDD) or flash memory.

Dock 102 may include Non-Volatile Storage (NVS) 110, such as ROM, flash memory, and the like. NVS 110 may have stored firmware (F/W) 112 for execution on processing unit 104. In one embodiment, firmware 112 includes instructions for preboot routines prior to an Operating System (OS) load and execution on dock 102. Firmware 112 may also include low-level input/output instructions for communicating with devices of dock 102 during OS runtime. Firmware 112 may also be referred to as a Basic Input/Output System (BIOS).

In typical architecture, the initialization and configuration of a computing device is commonly referred to as the preboot phase. The preboot phase is generally defined as firmware that executes between the processor reset and the first instruction of the Operating System (OS) loader. The instructions that execute during preboot are often referred to as the Basic Input/Output System (BIOS). At the start of preboot, it is up to the instructions in the firmware to initialize the system to the point that an OS loaded off of media, such as a hard disk, can take over. The start of the OS load begins the period commonly referred to as OS runtime. The instructions for implementing the OS and/or applications may be referred to as a boot image.

During OS runtime, the BIOS may act as an interface between software and hardware components of a computer system. The operational environment between the OS level and the hardware level is generally referred to as the BIOS (sometimes referred to as the firmware environment). Also, OS activity may be suspended when the OS enters a sleep state, such as a sleep state defined in the Advanced Configuration and Power Interface (ACPI) specification. The BIOS may be involved in waking the OS from a sleep state.

Referring to mobile device 120, in one embodiment, mobile device 120 may include a free standing computing device, such as a mobile phone, a media player, and the like. In another embodiment, mobile device 120 may include a host-dependent mobile device, such as a Universal Serial Bus (USB) Flash Drive, a memory card, a smart card, and the like. As used herein, "host-dependent" refers to a mobile device that may not be utilized unless the mobile device is connected to a host.

Mobile device 120 may include a controller 124 coupled to storage 126. Controller 124 may manage the reading/writing of data on storage 126 as well as perform other functions. Storage 126 may include a magnetic disc drive, an optical drive, non-volatile storage, such as flash memory, and the like. Mobile device 120 may also include one or more communication connections 122 for connecting mobile device 120 to other computing devices.

Connection 116 may include a wired or a wireless connection between dock 102 at communication connection 114 and mobile device 120 at communication connection 122. In one embodiment, dock 102 and mobile device 120 are in close proximity to one another as part of a user's Personal Area Network (PAN). Examples of connection 116 include USB (wired or wireless), firewire (IEEE 1394), radio frequency (e.g., Bluetooth, Wi-Fi, etc.), infrared, and the like.

Figure 2:
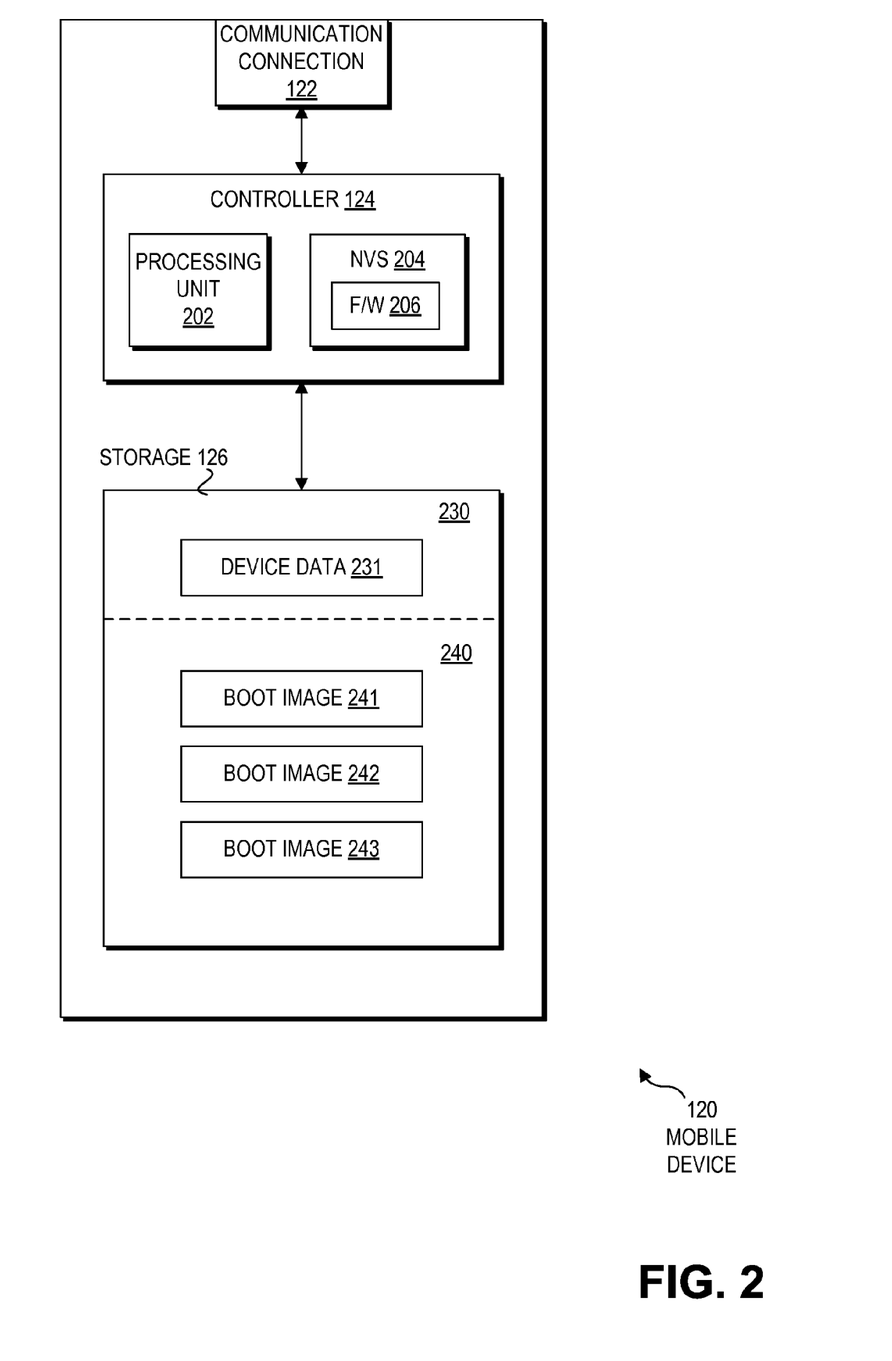
FIG. 2 is a block diagram of a mobile device in accordance with an embodiment of the invention.

Turning to FIG. 2, an embodiment of mobile device 120 is shown. Controller 124 may include a processing unit 202 and Non-Volatile Storage (NVS) 204. Processing unit 202 may include a general processor, such as a 32-bit Reduced Instruction Set Computing (RISC) processor. While a single processing unit 202 is shown, embodiments of mobile device 120 may include multiple processing units such as multiple processors, multiple cores, and the like. In one embodiment, controller 124 may include dedicated circuitry (not shown) for conducting specialized operations such as cryptography, digital rights management, digital signal processing, and the like.

In one embodiment, NVS 204 has stored firmware 206 that may be executed by processing unit 202. Firmware 206 may include a device boot image. The device boot image may include an operating system (such as a Real-Time Operating System (RTOS)), one or more applications, and the like, for execution on mobile device 120. Firmware 206 may also include instructions for executing embodiments of the invention.

The embodiment of FIG. 2 shows storage 126 divided into partition 230 and partition 240. One skilled in the art having the benefit of this description will understand that storage 126 may include more than two partitions. Partition 230 includes instructions and/or data for mobile device 120, such as device data 231. Mobile device 120 may run software natively or in a virtual machine. Security measures may be used to protect access to partition 230 by connected computing devices, such as dock 102.

Partition 240 may include instructions and/or data for use by another computing device, such as dock 102. FIG. 2 shows partition 240 having boot images 241, 242, and 243. A boot image may include instructions for executing an OS and/or applications on a computing device. Example boot images include a Microsoft Windows® OS and/or Office applications, a .NET Framework environment, a Java® environment, and the like. As described below, mobile device 120 may send a boot image to dock 102 for execution on dock 102. In one embodiment, access to partition 240 may be restricted to a circle of trusted docks.

Figure 3:
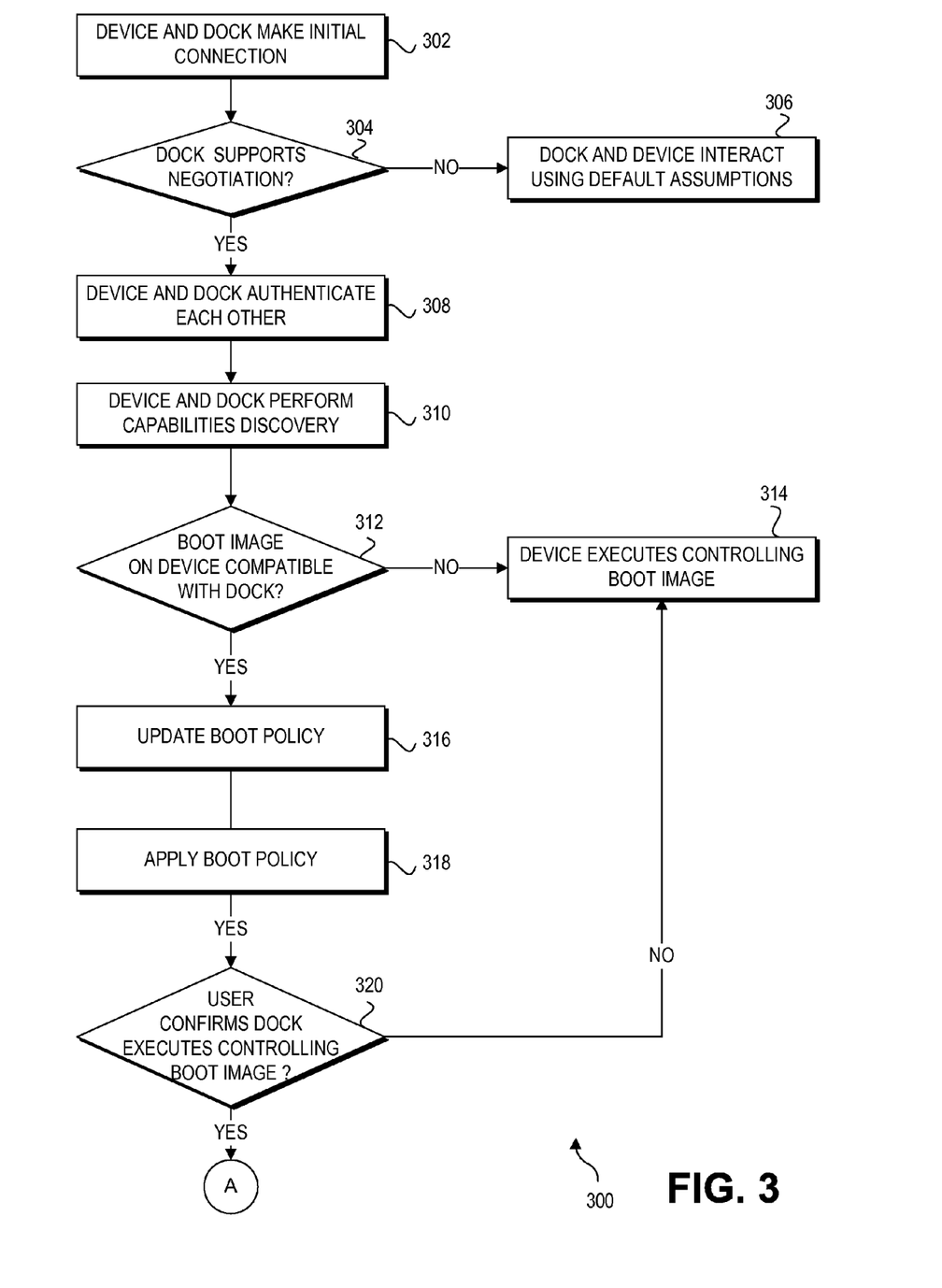
FIG. 3 is a flowchart showing the logic and operations of a mobile device and a dock performing boot negotiation in accordance with an embodiment of the invention.

Turning to FIG. 3, a flowchart 300 shows the logic and operations of a mobile device and a dock performing a boot negotiation in accordance with an embodiment of the invention. In one embodiment, at least a portion of the logic of flowchart 300 may be conducted by device OS of mobile device 120. The mobile device and the dock come to each other without assumptions about their relationship or about each others capabilities. The determination of which device will execute a controlling boot image is not made until after negotiations have completed.

As used herein, "controlling boot image" refers to the boot image executing on a computing device that may manage at least some of the resources of the other computing device. For example, when the dock boots from a boot image provided by the mobile device, the dock may use resources of the mobile device, such as storage. When the mobile device executes the controlling boot image (e.g., the mobile device OS), then the mobile device may use the resources of the dock, such as the keyboard, video monitor, and mouse (KVM) for human input/output to the mobile device.

The boot negotiation may be conducted using a negotiation protocol. In one embodiment, the negotiation protocol includes a logic level running on a well known physical level protocol. The negotiation protocol may be used for negotiation communications such as reporting resources and their capabilities, securing the negotiation session, sending boot images from the device to the dock, and the like. In one embodiment, the boot negotiation between the mobile device and the dock takes place between the BIOS of the dock and the OS of the mobile device (discussed further below in conjunction with FIG. 8).

Starting in block 302 of flowchart 300, the device and the dock make an initial connection. For example, the device and the dock may be physically connected by a wire, they may be brought in physical proximity of one another for a wireless connection, or a wireless connection is enabled. In block 302, the device and the dock may perform some handshaking to establish the initial connection. In one embodiment, making the initial connection includes establishing a secured connection between the mobile device and the dock.

Proceeding to decision block 304, the device queries the dock to determine if the dock supports boot negotiation as described herein. In one embodiment, this query is conducted using a negotiation protocol understood by both device and dock. In one embodiment, the dock BIOS conducts the boot negotiations with the mobile device OS. In this way, the boot negotiation may be conducted during preboot of the dock without necessity of an OS executing on the dock. The dock BIOS boot negotiation tasks include discovery of the connected mobile device, establishing communications (in some cases secure communications), and reporting the dock's capabilities.

It is noted that the device and the dock do not assume their roles when connected. In some communication systems (e.g., USB), a connected device may be assumed to always be a device (i.e., a slave) to another computing device. Similarly, computing devices, such as a laptop computer, may assume to be a host (i.e., a master) when connected to a USB device. To support boot negotiation, the BIOS and hardware components of a computing device allow a connected device to take control. In embodiments herein, hardware communications (e.g., chipset) and BIOS of computing devices make no assumptions about their role (e.g., master or slave) when connecting to another computing device. As described below, embodiments of the invention may include security measures to prevent a rogue device from compromising security of another computing device.

If the answer to decision block 304 is no, then the logic proceeds to block 306. In block 306, the dock and the device will interact with one another using default assumptions. For example, if the device is defaulted as a slave device, then the device will take the default role of slave device without negotiation. The dock may execute a default boot image it has stored.

If the answer to decision block 306 is yes, then the logic continues to block 308. At block 308, the device and the dock may authenticate each other. In alternative embodiments, the authentication may be only one way. For example, only the device authenticates the dock or only the dock authenticates the device. The authentication may be implemented using a signature, certificate, or the well known authenticate schemes.

Continuing to block 310, the device and the dock perform capabilities discovery. In one embodiment, the device queries the dock to reports its resources and the resources capabilities using a negotiation protocol as described above. Example capabilities include processing capabilities (e.g., processor type, processor speed, etc.) and memory capabilities (e.g., memory size, memory speed, etc.). Capabilities may also include any storage devices, their type, capacities, available storage space, file systems, and the like. Capabilities may also include the video and/or audio capabilities of the dock. Capabilities may also include communication connections and the bandwidth of any such connections.

Figure 7:
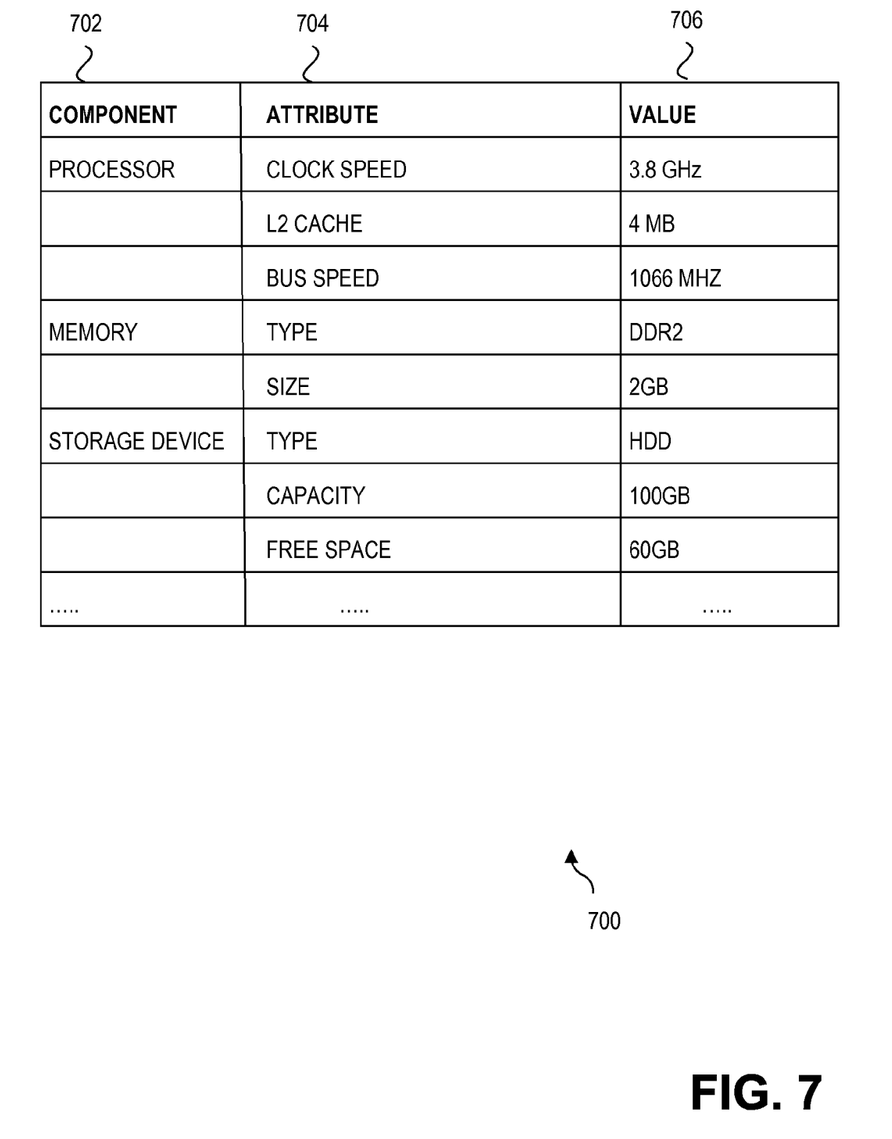
FIG. 7 is a capabilities reporting table in accordance with an embodiment of the invention.

Referring to FIG. 7, a capabilities reporting table 700 in accordance with an embodiment of the invention is shown. In one embodiment, the dock BIOS generates table 700 and sends table 700 to the mobile device using the negotiation protocol. The mobile device generates its own capabilities reporting table for comparison to the table received from the dock.

Table 700 includes columns for components 702, attributes 704 for the components, and values 706 for those attributes. For example, under processor, attributes of clock speed, L2 cache, and bus speed are reported. In one embodiment, the information in table 700 may be organized into one or more schemas for passing resource information between the dock and the mobile device. The schema(s) may be part of the negotiation protocol used by the dock and the mobile device.

After block 310, the logic proceeds to block 312 to determine if the dock is compatible with a boot image stored on the device using the dock's reported capabilities. For example, in FIGS. 1 and 2, the logic determines if dock 102 may execute any of boot images 241-243 stored in mobile device 120. If the answer to decision block 312 is no, then the logic proceeds to block 314. In one embodiment, boot image compatibility may be based on the dock's processor speed, memory size, video capabilities, and the like.

In block 314, the device executes the controlling boot image. In one embodiment, the mobile device OS, which is already executing, adopts the hardware resources of the dock. For example, if the dock has a storage device, such as a HDD, then the dock's HDD is accessible by the mobile device OS.

In another example, the KVM of a laptop (i.e., dock) may be used to interact with a mobile phone device.

If the answer to decision block 312 is yes, then the logic proceeds to block 316. In block 316, the logic updates boot policy stored on the mobile device before application of the boot policy in block 318. In one embodiment, the mobile device contacts a central update site, such as Microsoft Windows® Update. The mobile device may use its own communication connection or a communication connection on the dock to check for updates.

Continuing to block 318, the logic applies boot policy. The policy determines if booting the dock with one or more compatible boot images from the mobile device is complicit with policy. The policy may be modifiable by a user and/or system administrator. In one embodiment, the policy is stored on the device. In another embodiment, policy stored on the dock is passed to the device during boot negotiation. Policy from the device and the dock may be applied in combination.

In one embodiment, the capabilities of the device and dock are compared to determine whether the dock or the mobile device will execute the controlling boot image. For example, a policy may indicate that the computing device with the faster processor shall always take control. Another policy may analyze a range of capabilities (such as processor speed, memory size, bandwidth capability) in determining the controlling machine. For example, information from table 700 for the device and the dock may be put into an equation that assigns points to the various components and their attribute values. In the equation, some component attributes may be weighted. The computing device (mobile device or dock) with the highest score is determined to be the computing device to execute the controlling boot image.

In another embodiment, the policy may include referring to past user activity for determining whether the dock or the mobile device will execute the controlling boot image. For example, if the dock had previously boot from a boot image on the device, then the dock is booted again from that boot image.

Policy may also include determining which boot image the dock is to boot from when multiple compatible boot images are stored on the device. In one embodiment, the logic determines which boot image will provide the best performance. For example, the boot image that will provide the best performance based on the dock's processor speed and memory capacity may be chosen.

In an alternative embodiment, all the compatible boot images are displayed to a user. The user may choose the desired boot image for the dock. In one embodiment, user selection of the boot image may occur in decision block 320 described below.

At decision block 320, the logic determines if the user confirms the determination of whether the device or the dock is to execute the controlling boot image. In one embodiment, a user interface is presented to enable a user to confirm the determination made in block 318. The user interface may be displayed on the device, on the dock, or on both. In one embodiment, if policy determines the dock is to execute a boot image from the mobile device, the device may display the name of the boot image the dock will be booted with. In yet another embodiment, if multiple boot images are compatible with the dock, then the multiple compatible boot images will be displayed and the user may select the desired boot image for the dock.

At block 320, if the user does not confirm booting the dock, then the logic proceeds to block 314. If the user confirms booting the dock at decision block 320, then the logic continues to block 322.

In an alternative embodiment, user confirmation as described in decision block 320 is not utilized. In this particular embodiment, the negotiation process will be concealed from the user. For example, a user may connect a mobile phone to a personal computer and push a "negotiate" button on the mobile phone to initiate negotiations. The negotiation process is conducted. The user may then use the KVM of the personal computer to conduct their business. It is not necessary for the user to realize which computing device is executing the controlling boot image. The boot negotiation may occur transparent to the user.

Figure 4:
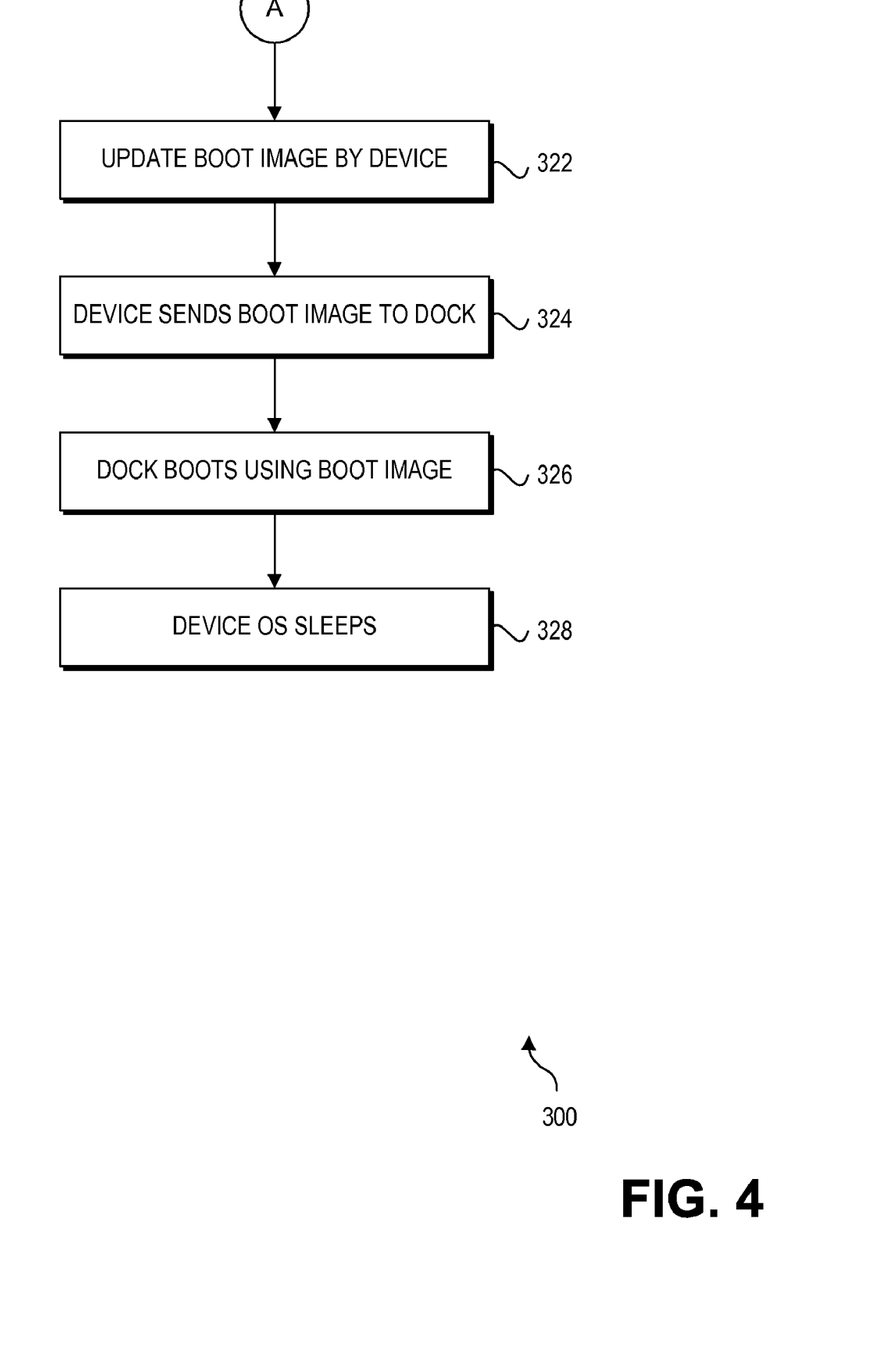
FIG. 4 is a continuation of the flowchart of FIG. 3 in accordance with an embodiment of the invention.

Turning to FIG. 4, in block 322, the device updates the boot image prior to sending the boot image to the dock for execution. In one embodiment, the device uses its own communication connection to connect to a network, such as the Internet, for checking for any updates. In another embodiment, the device may use a communication connection of the dock to check for any updates to the boot image.

After block 322, the logic continues to block 324 where the mobile device sends the boot image to the dock. Next, in block 326, the dock boots from the boot image. Once the dock is booted with the boot image, the device is available to the dock. For example, after a laptop (dock) boots from a boot image stored on a connected mobile phone (device), the laptop may manage resources of the mobile phone. For example, a storage device of the mobile phone may be used by the dock. Security measures may be used to restrict access to some data stored on the device, such as in partition 230, by the dock.

Next, in block 328, the OS of the mobile device goes to sleep. The mobile device OS may wakeup and re-take control of the device when the connection to the dock has been broken and/or cannot be re-established after a particular threshold. The threshold may include a number of re-connect attempts or a predefined amount of time.

Figure 5:
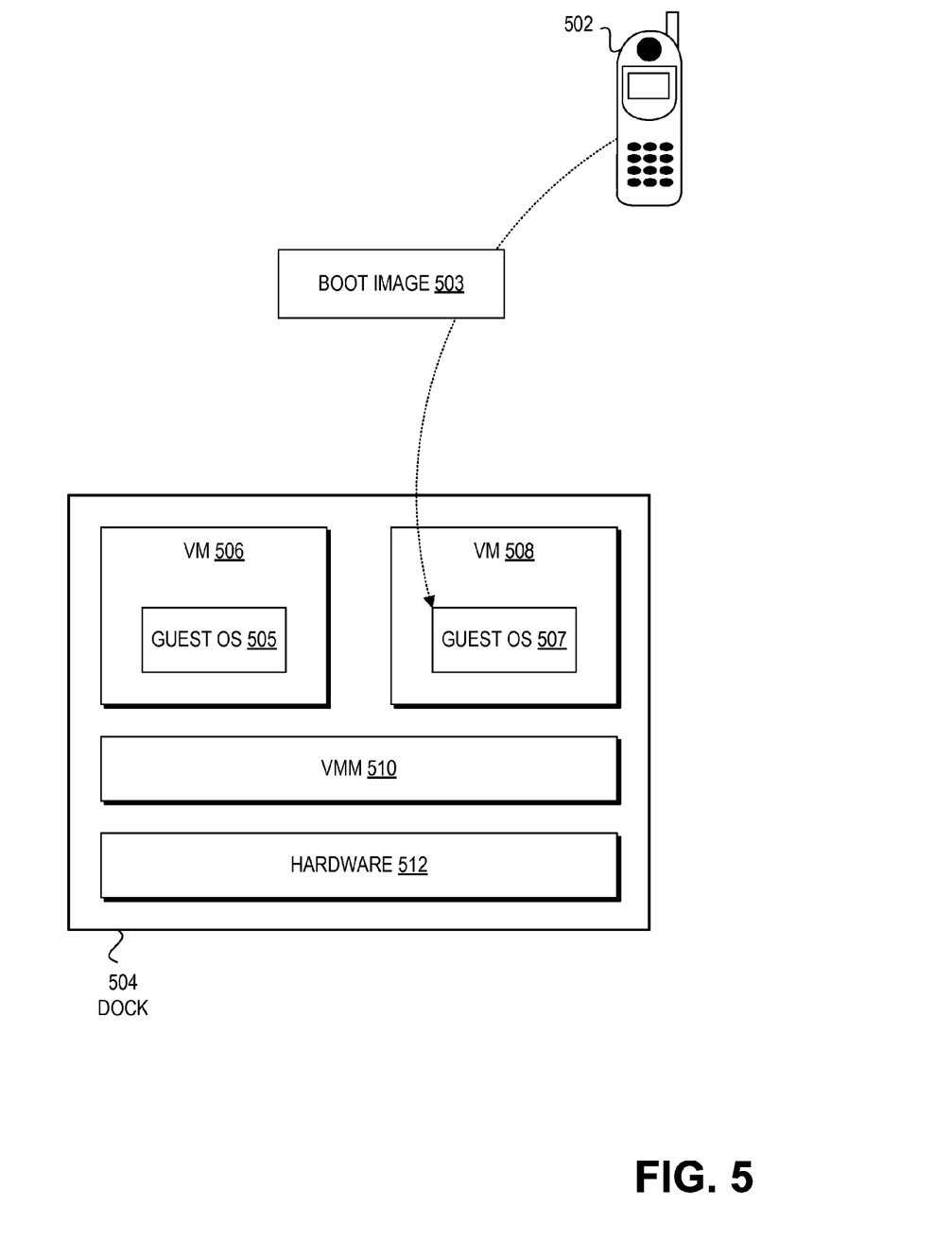
FIG. 5 is a block diagram of a mobile phone providing a virtual machine boot image in accordance with an embodiment of the invention.

Turning to FIG. 5, an embodiment of a Virtual Machine (VM) environment is shown. In FIG. 5, a mobile device, shown as mobile phone 502, may send a boot image 503 to dock 504. Dock 504 is executing a VM environment. In dock 504, dock hardware 512 is managed by a Virtual Machine Manager (VMM) 510. VMM 510 may support one or more VMs, such as VM 506 and VM 508. VM 506 executes guest OS 505. In general, VMs may be created and torn down as desired in a VM environment. Also, each VM operates independently so that a system error in one VM, such as an operating system crash, does not affect the other VMs.

In accordance with embodiments herein, a negotiation may occur between mobile phone 502 and dock 504 while dock 504 is running a VM environment. Mobile phone 502 may send boot image 503 to dock 504 for execution in VM 508. The execution of boot image 503 is shown as guest OS 507.

In one example, the use of a VM environment allows the use of a boot image from mobile phone 502 without having to boot the entire dock 504. VM 508 may be created at dock 504 for executing boot image 503. Further, VM 508 may be taken down, but VM 506 may remain up, when the user has finished with guest OS 507.

Figure 6:
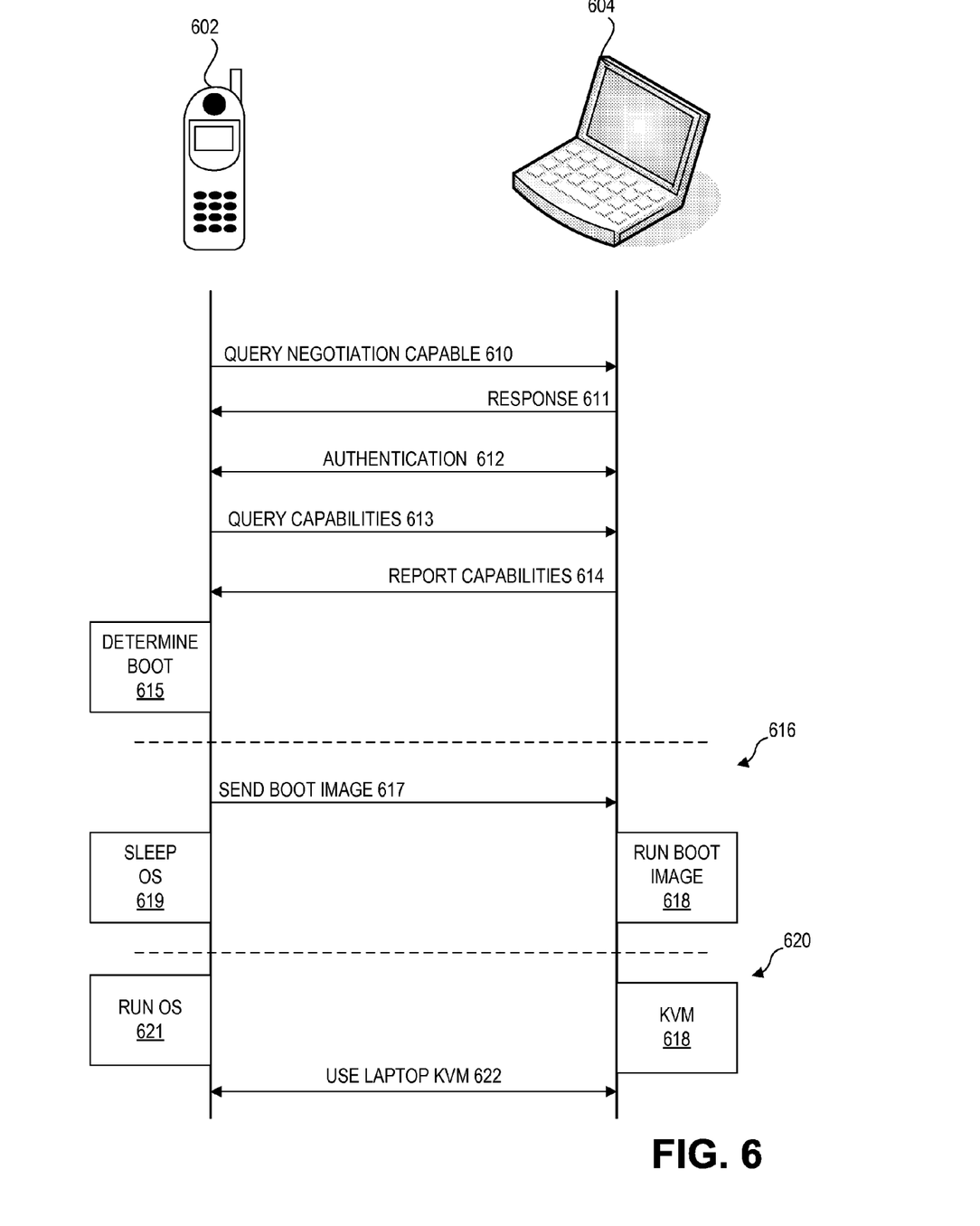
FIG. 6 is a block diagram of a mobile phone and a laptop performing boot negotiation in accordance with an embodiment of the invention.

Turning to FIG. 6, an embodiment of a mobile phone 602 (device) and a laptop 604 (dock) performing boot negotiation is shown. In one embodiment, the boot negotiation is conducted using a negotiation protocol. At 610, mobile phone 602 asks laptop 604 if it is negotiation capable. Laptop 604 provides a positive response 611 to mobile phone 602. At 612, mobile phone 602 and laptop 604 authenticate each other.

At 613, mobile phone 602 queries laptop 604 for its capabilities. At 614, laptop 604 responds by reporting its capabilities. Laptop 604 may report its capabilities using an embodiment of table 700.

At 615, mobile phone 602 determines whether the boot image executed on mobile phone 602 or a boot image executed on laptop 604 will take control. In exchange 616, mobile device 602 sends a boot image (shown at 617) to laptop 604. In one embodiment, mobile device 602 checks for updates to the boot image before sending the boot image to laptop 604. At 618, laptop 604 executes the boot image from mobile phone 602. In one embodiment, the boot image is executed in a VM environment on laptop 604.

At 619, the OS of mobile phone 602 goes into a sleep state after sending the boot image to laptop 604. Thus, when the connection between mobile phone 602 and laptop 604 is severed, mobile phone 602 may continue operation using its own OS without having to reboot the mobile phone OS.

Alternatively, in exchange 620, the OS of mobile phone 602 manages the resources of laptop 604 (shown at 621). Mobile phone 602 may switch its software state to access peripherals on laptop 604 without rebooting the mobile phone OS. For example, mobile phone 602 may use the KVM of laptop 604 (shown at 622). When the connection between mobile phone 602 and laptop 604 ends, then mobile phone 602 may switch back to using its own input/output devices. A reboot of mobile phone 602 is unnecessary.

Figure 8:
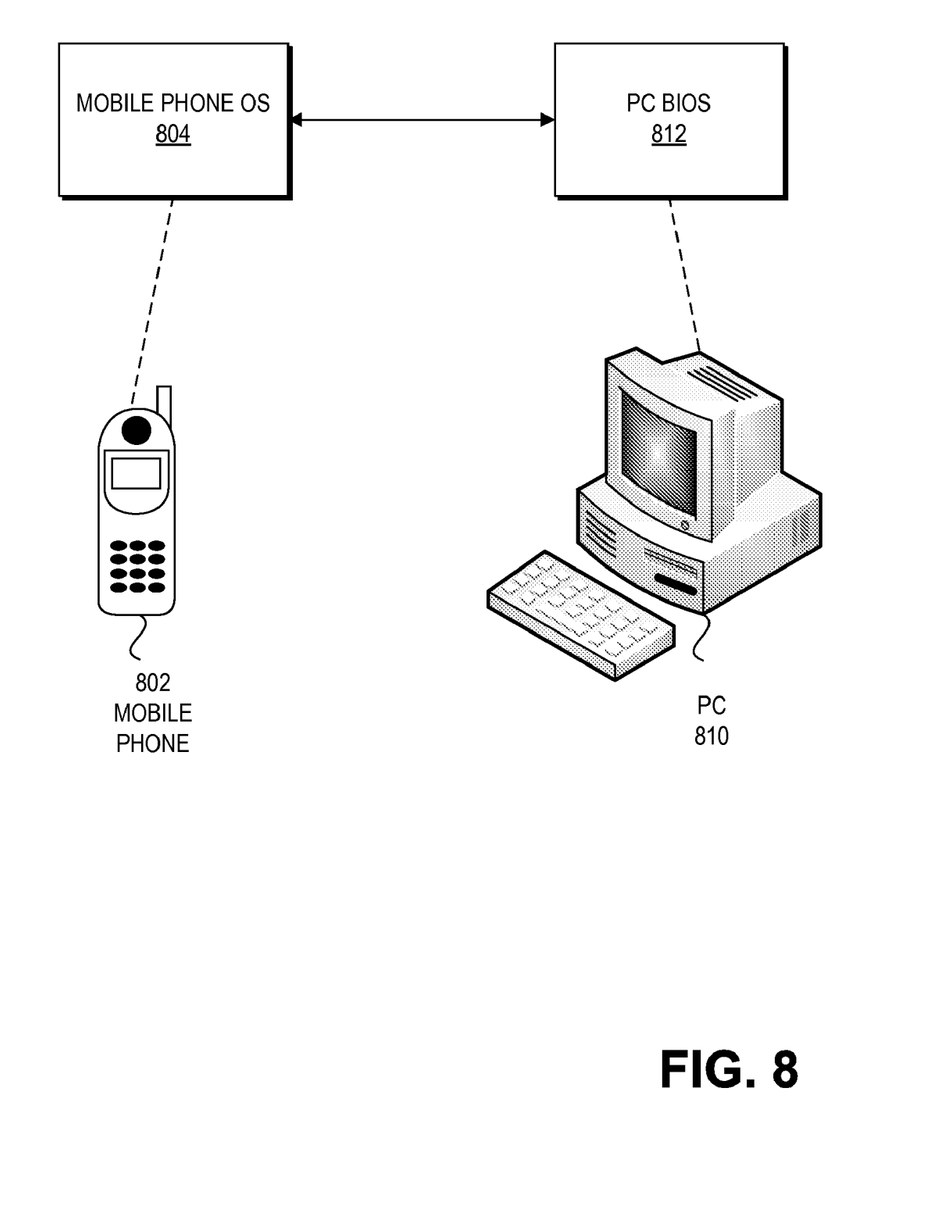
FIG. 8 is a block diagram of a mobile phone and a personal computer performing boot negotiation in accordance with an embodiment of the invention.

Turning to FIG. 8, usage scenarios in accordance with embodiments of the invention will be described. It will be appreciated that embodiments of the invention are not limited to the scenarios described below. FIG. 8 shows a mobile phone 802 (i.e., mobile device) connected to a Personal Computer (PC) 810 (i.e., dock). FIG. 8 shows the boot negotiation process taking place between the mobile phone OS 804 and the PC BIOS 812.

In one scenario, embodiments of the invention may be used in a public computing environment. In some cases, the public computing environment may be managed by a telephone company ("Telco") that provides services to both mobile phone 802 and PC 810. PC 810 may be a public computer at a mall kiosk, internet café, or the like.

For example, a user with mobile phone 802 in OS runtime approaches PC 810. PC 810 is currently off. The user places mobile phone 802 within proximity of PC 810 for establishing a wireless connection or connects mobile phone 802 and PC 810 with a cable for a wired connection. The user then turns on PC 810. The boot negotiation process begins with mobile device OS 804 communicating with PC BIOS 812. After the boot negotiation, the user may use the KVM of PC 810 to interact with mobile device OS 804 or the user may use the KVM of PC 810 to interact with a boot image sent from mobile phone 802 booted on PC 810. In either case, mobile phone 802 may be used for storage by the user. In this way, the user may easily take their work with them when they leave the public computer (i.e., PC 810).

In alternative embodiments, if PC 810 is in a sleep state or OS runtime when the user begins the negotiation process, PC 810 may have to be rebooted to execute a boot image from mobile phone 802. In yet another embodiment, PC 810 may stay in OS runtime and execute a boot image received from mobile phone 802 in a virtual machine environment.

In the Telco usage scenario, the user may have one account of minutes that may be used with mobile phone 802 and PC 810. Also, since mobile phone 802 and PC 810 are part of the same Telco network, updates to boot policy may be pushed to mobile phone 802 and/or PC 810. Updates to boot images on mobile phone 802 may also be pushed to mobile phone 802 through the Telco network.

In another scenario, embodiments of the invention may be used in an organization's managed network, such as an enterprise network. Mobile phone 802 and PC 810 are part of the enterprise network. Again, a user connects mobile phone 802 to PC 810 and begins the boot negotiation process. The user may then use the KVM of PC 810 to interact with the controlling boot image on mobile phone 802 or on PC 810.

This enterprise network scenario may be utilized in various ways. Employees may be issued a mobile device, such as mobile phone 802. The employee may then carry various boot images with them that may be used with various PCs in the organization. Also, the user always has access to their data since the user's data is centralized on their mobile device instead of being spread across several machines (e.g., corporate mobile device and various corporate desktops). Additionally, boot policy updates and boot images updates may be easily pushed to mobile phone 802.

Figure 9:
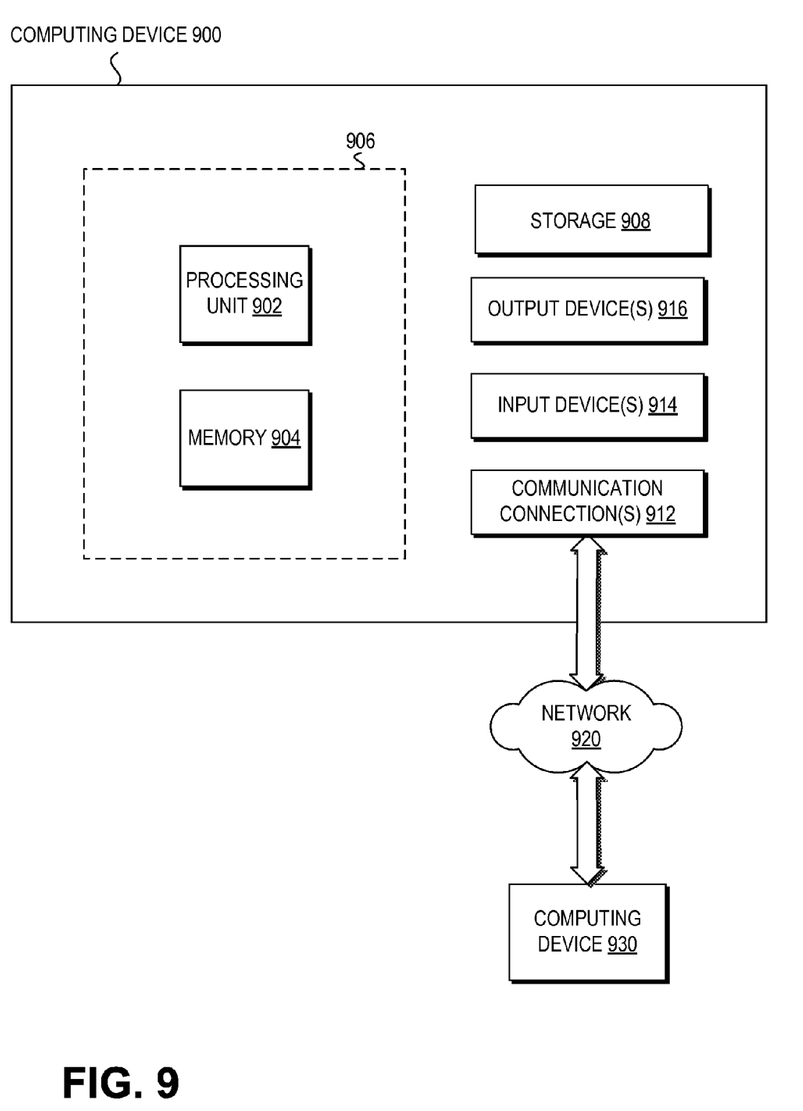
FIG. 9 is a block diagram of an example computing device for implementing embodiments of the invention.

FIG. 9 shows an example of a computing device 900 for implementing one or more embodiments of the invention. Embodiments of computing device 900 may be used as dock 102 and/or mobile device 120. In one configuration, computing device 900 includes at least one processing unit 902 and memory 904. Depending on the exact configuration and type of computing device, memory 904 may be volatile (such as RAM), non-volatile (such as ROM, flash memory, etc.) or some combination of the two. This configuration is illustrated in FIG. 9 by dashed line 906.

In other embodiments, device 900 may include additional features and/or functionality. For example, device 900 may also include additional storage (e.g., removable and/or non-removable) including, but not limited to, magnetic storage, optical storage, and the like. Such additional storage is illustrated in FIG. 9 by storage 908. In one embodiment, computer readable instructions to implement embodiments of the invention may be in storage 908. Storage 908 may also store other computer readable instructions to implement an operating system, an application program, and the like.

The term "computer readable media" as used herein includes computer storage media. Computer storage media includes volatile and nonvolatile, removable and non-removable media implemented in any method or technology for storage of information such as computer readable instructions or other data. Memory 904 and storage 908 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 900. Any such computer storage media may be part of device 900.

Device 900 may also include communication connection(s) 912 that allow device 900 to communicate with other devices. Communication connection(s) 912 may include, but is not limited to, a modem, a Network Interface Card (NIC), a USB connection, an infrared port, or other interfaces for connecting computing device 900 to other computing devices. Communication connection(s) 912 may include a wired connection or a wireless connection. Communication connection(s) 912 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, Near Field Communication (NFC), and other wireless media.

Device 900 may include input device(s) 914 such as keyboard, mouse, pen, voice input device, touch input device, infrared cameras, video input devices, and/or any other input device. Output device(s) 916 such as one or more displays, speakers, printers, and/or any other output device may also be included in device 900. Input device(s) 914 and output device(s) 916 may be connected to device 900 via a wired connection, wireless connection, or any combination thereof. In one embodiment, an input device or an output device from another computing device may be used as input device(s) 914 or output device(s) 916 for computing device 900.

Components of computing device 900 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 900 may be interconnected by a network. For example, memory 904 may be comprised of multiple physical memory units located in different physical locations interconnected by a network.

Those skilled in the art will realize that storage devices utilized to store computer readable instructions may be distributed across a network. For example, a computing device 930 accessible via network 920 may store computer readable instructions to implement one or more embodiments of the invention. Computing device 900 may access computing device 930 and download a part or all of the computer readable instructions for execution. Alternatively, computing device 900 may download pieces of the computer readable instructions, as needed, or some instructions may be executed at computing device 900 and some at computing device 930. Those skilled in the art will also realize that all or a portion of the computer readable instructions may be carried out by a dedicated circuit, such as a Digital Signal Processor (DSP), programmable logic array, and the like.

Various operations of embodiments of the present invention are described herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment of the invention.

The above description of embodiments of the invention, including what is described in the Abstract, is not intended to be exhaustive or to limit the embodiments to the precise forms disclosed. While specific embodiments and examples of the invention are described herein for illustrative purposes, various equivalent modifications are possible, as those skilled in the relevant art will recognize in light of the above detailed description. The terms used in the following claims should not be construed to limit the invention to the specific embodiments disclosed in the specification. Rather, the following claims are to be construed in accordance with established doctrines of claim interpretation.

What is claimed is:

1. A method, comprising:
discovering, by a first device, the capabilities of a second device;
determining, by the first device, which of the first device and the second device is to execute a controlling boot image based at least in part on the capabilities of the first device and the second device;
executing a first boot image by the first device when the first device is determined to execute the controlling boot image, the second device to be a resource for the first boot image; and
sending, by the first device, a second boot image stored on the first device to the second device for execution when the second device is determined to execute the controlling boot image, wherein the first device to be a resource for the second boot image.

2. The method of claim 1, comprising:
determining, by the first device, whether the second boot image is compatible with the second device.

3. The method of claim 1, comprising:
determining, by the first device, whether executing the second boot image on the second device is in compliance with a boot policy stored on the first device.

4. The method of claim 3, comprising:
updating the boot policy, by the first device, by contacting a central site before determining whether executing the second boot image on the second device is in compliance with the boot policy stored on the first device.

5. The method of claim 1, comprising:
updating, by the first device, the second boot image before sending the second boot image to the second device.

6. The method of claim 1, comprising:
entering a sleep state by an operating system executing on the first device after sending the second boot image to the second device; and
waking up from the sleep state when a connection between the first device and the second device is severed.

7. The method of claim 1, comprising:
establishing a connection between the first device and the second device, wherein the first device is in operating system runtime and the second device is in preboot.

8. The method of claim 1 wherein discovering the capabilities of the second device comprises receiving, at the first device, capabilities reporting data from the second device in response to a capabilities query from the first device.

9. The method of claim 1, comprising:
authenticating the second device by the first device.

10. The method of claim 1, wherein determining which of the first device and the second device is to execute a controlling boot image comprises receiving, at the first device, confirmation of the determination from a user.

11. A method, comprising:
making a connection between a mobile device and a dock, wherein the mobile device is executing a first boot image and the dock is in preboot;
determining which of the mobile device and the dock to execute a controlling boot image based at least in part on capabilities of the mobile device and the dock;
when the dock is to execute the controlling boot image, sending a second boot image from the mobile device to the dock and executing the second boot image on the dock, wherein the second boot image includes the controlling boot image; and
when the mobile device is to execute the controlling boot image, executing the first boot image on the mobile device, wherein the first boot image includes the controlling boot image.

12. The method of claim 11 wherein determining which of the mobile device and the dock to execute a controlling boot image comprises determining if the dock is compatible with one or more boot images stored on the mobile device.

13. The method of claim 11 wherein the second boot image is executed in a virtual machine environment of the dock.

14. The method of claim 11, comprising:
updating the second boot image by the mobile device prior to sending the second boot image to the dock for execution on the dock.

15. The method of claim 11 wherein when the dock is to execute the controlling boot image, comprising:
entering a sleep state by the first boot image executing on the mobile device.

16. The method of claim 11, comprising:
receiving, at the mobile device, capabilities reporting data from the dock in response to a capabilities query from the mobile device.

17. A system, comprising:
a first computing device connected to a second computing device, wherein the first computing device having stored computer readable instructions that when executed by the first computing device perform operations comprising:
discovering capabilities of the second computing device;
determining which of the first computing device and the second computing device is to execute a controlling boot image based at least in part on capabilities of the first computing device and the capabilities of the second computing device;
executing a first boot image by the first computing device when the first computing device is determined to execute the controlling boot image, the second computing device to be a resource for the first boot image; and
sending the second boot image stored on the first computing device to the second computing device for execution when the second computing device is determined to execute the controlling boot image, wherein the first computing device to be a resource for the second boot image.

18. The system of claim 17 wherein determining which of the first computing device and the second computing device is to execute a controlling boot image comprises determining if the second computing device is compatible with one or more boot images stored on the first computing device.

19. The system of claim 17 wherein determining which of the first computing device and the second computing device is to execute a controlling boot image comprises applying policy stored on the first computing device.

20. The system of claim 17 wherein determining which of the first computing device and the second computing device is to execute a controlling boot image comprises receiving confirmation of the determination from a user.

* * * * *